Oct. 13, 1970

M. L. TREASTER
FISHING LURE 3,533,183

Filed Oct. 3, 1968

(0 DEGREES)

(90 DEGREES)

(180 DEGREES)

(270 DEGREES)

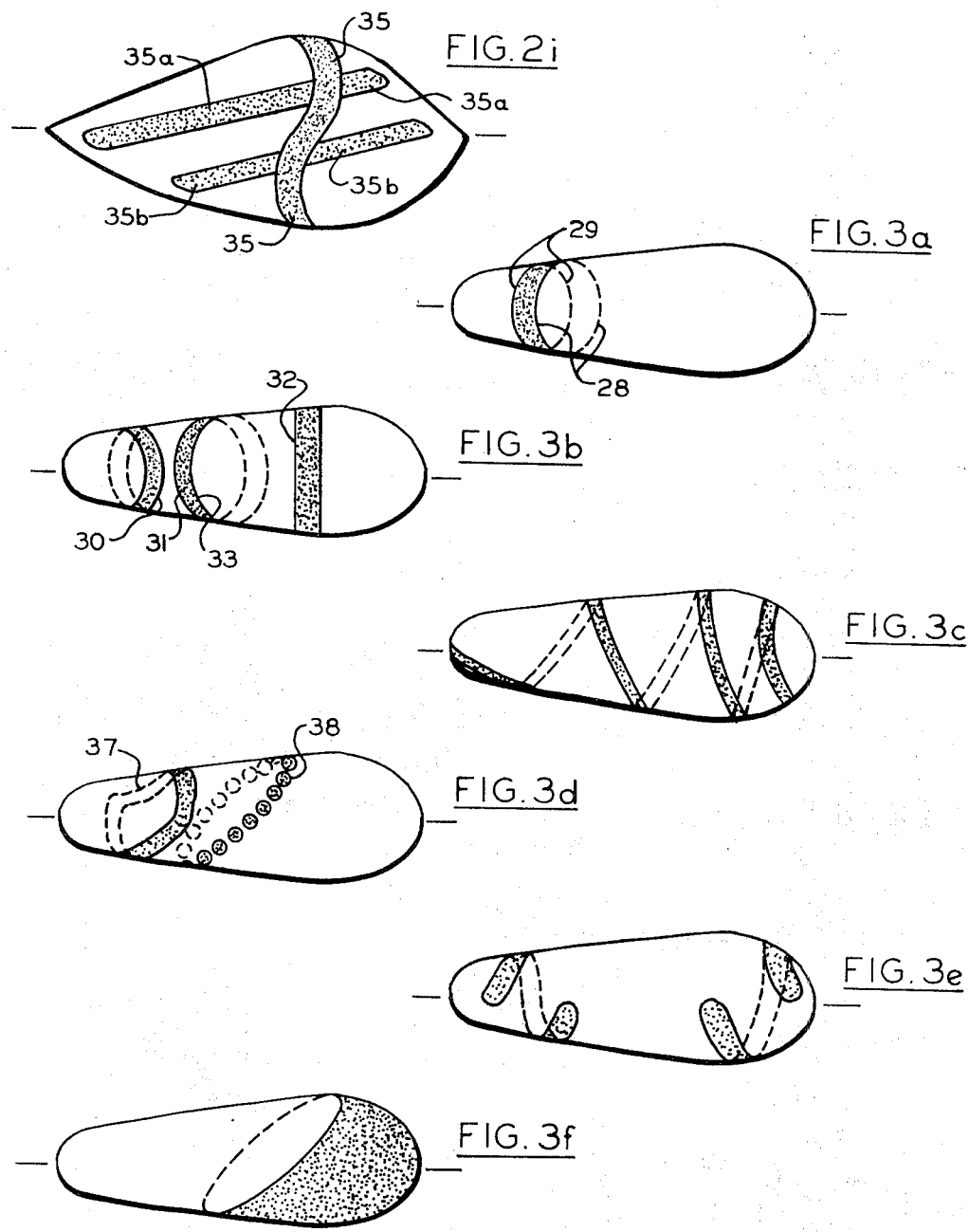

United States Patent Office 3,533,183
Patented Oct. 13, 1970

3,533,183
FISHING LURE
Mahlon L. Treaster, R.D. 2, Harpursville, N.Y. 13787
Continuation-in-part of application Ser. No. 466,395,
June 23, 1965. This application Oct. 3, 1968, Ser.
No. 764,879
Int. Cl. A01k 85/00
U.S. Cl. 43—42.21                                                   7 Claims

ABSTRACT OF THE DISCLOSURE

A fishing lure having a continuously rotatable plug body and indicia on said body defining a boundary line between contrasting colors, with the boundary line extending at an acute angle relative to a plane perpendicular to the axis of rotation of the body and extending substantially around said body, so that portions of said body appear to move relative to said body as the lure body is rotated.

---

This application is a continuation-in-part of my prior copending application Ser. No. 466,395 filed June 23, 1965, which prior application discloses a floatable fishing lure comprising a plug body mounted to be continuously rotatable about a shaft and provided with blades which serve to rotate the plug body about the shaft as the lure is pulled through the water. The blades are preferably provided with a relatively small pitch angle, so that the plug body rotates relatively slowly as the lure is pulled through the water at normal reeling speeds or trolling speeds.

It is widely believed among many sport-fishing authorities that lures which very closely and realistically resemble various insects, bugs, minnows or other water life in both shape and color are most effective for attracting various species of fish. Substantially all authorities agree that a "live" appearance, or appearance of motion, is highly desirable. While fish themselves swim largely by means of a wriggling side-to-side motion, substantially all forms of insects or other animal life upon which fish feed progress through the water irregularly with a complex motion in which arms and legs move both backward and forward as the animal progresses generally forwardly. A variety of prior art lures provided with blades and other means realistically simulate fish or minnow swimming motion or "fishtailing," and some incorporate springs and like devices which tend to render forward motion of a lure somewhat intermittent as it is pulled through the water, but no satisfactory arrangement has been developed, so far as I am aware, for making a lure, or even parts of a lure move appreciably both forward and backward relative to the lure body as the lure body is pulled forwardly through the water. While such a lure conceivably might be made it apparently would be complex and expensive, and far too susceptible of snagging on weeds and the like. In accordance with one central concept of the present invention, a lure which actually moves only forwardly through the water, is provided with indicia such that rotation of the lure body creates the illusion that certain portions of the lure are moving both forwardly and rearwardly through the water. Thus it is a primary object of the invention to provide an improved fishing lure incorporating a continuously-rotatable body carrying color indicia which create the illusion of forward and backward motion of parts of the lure relative to the overall lure body as the lure is propelled through the water.

In accordance with the invention, a live appearance is created upon a substantially smooth continuously rotating lure by use of one or more color lines or color bands encircling the lure body non-perpendicularly to the axis of rotation of the continuously-rotatable body. Due to such non-perpendicular arrangement of the color lines, rotation of the body creates an illusion of cyclic forward and rearward motion of portions of the body, at a frequency dependent upon the speed of rotation of the body.

Other objects of the invention will in part be obvious and will, in part, appear hereinafter.

The invention accordingly comprises the features of construction, combination of elements, and arrangement of parts, which will be exemplified in the constructions hereinafter set forth.

For a fuller understanding of the nature and objects of the invention reference should be had to the following detailed description taken in connection with the accompanying drawings in which:

FIGS. 2h and 2i are developed views of the surface of a tapered or non-cylindrical body of revolution useful in understanding the operation of various forms of the present invention.

FIGS. 3a through 3f are single views illustrating various rotatable lure bodies having indicia patterns which may be used to practice the invention.

Figure 1:
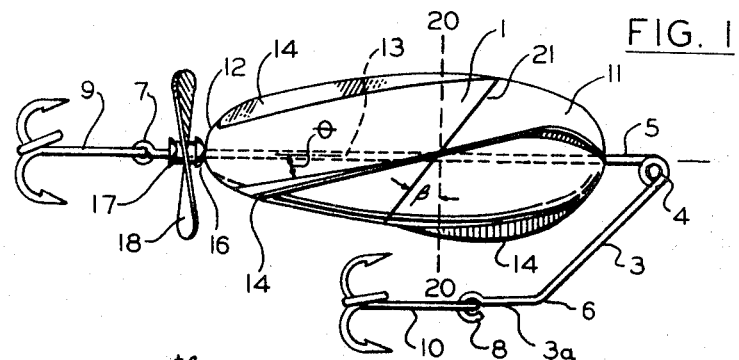
FIG. 1 is a side view of one embodiment of lure constructed in accordance with the present invention.

Referring to FIG. 1 the assembly shown therein will be seen to include a one-piece spring wire having a coil 4 wound intermediate two rearwardly-extending shaft portions 3 and 5, each of which extend at an acute angle relative to each other. A snap on a leader may engage coil 4 to pull the lure through the water. Upper shaft portion 5 is shown carrying a rotatable plug body 1 provided with an axial bore 13 and a plurality of fins 14, 14 which cause rotation of body 1 about shaft portion 5 as the lure is dragged through the water. Also shown mounted on shaft portion 5 is a rotatable bearing 17 carrying propeller 18. Washer 16 separates collar 17 from body 1 to allow propeller 18 and body 1 to rotate at different speeds with lessened friction between them. The pitch of propeller 18 is arranged to provide relatively rapid rotation of propeller 18 at normal reeling speeds, while the blades 14 cause much slower rotation of body 1, which carries important visible indicia, as will be explained below. The outer end of shaft portion 5 of the spring wire will be seen to terminate in a loop 7 which holds a conventional three-tine fishhook 9. Lower shaft portion 3 of the spring wire will be seen to extend downwardly at an acute angle from coil 4 for a distance sufficient that hook 10, which is attached by loop 8 at the rear end of shaft portion 3, will not interfere with rotation of body 1. A bend 6 is preferably provided in shaft 3 as shown, so that terminal portion 3a of shaft portion 3 lies substantially parallel to upper shaft portion 5. As the lure advances forwardly through the water in the direction of shaft 5, it will be seen that shaft portion 3 will act as a weed deflector, preventing weeds from interfering with rotation of plug body 1. If weeds catch on hook 10 as the lure is pulled through the water, it will be seen that the forces applied to coil 4 will tend to tighten or wind up coil 4, and the resilience provided by coil 4 resists permanent deformation which otherwise might result when the lure is pulled hard enough to free it from a weed upon which hook 10 is engaged. As well as functioning as a weed deflector and carry a hook, lower shaft portion 3 will be seen to act as a stabilizing means which prevents upper shaft portion 5 from rotating with rotatable body 1, thereby obviating twisting of the fishing line as body 1 rotates. In addition to, or in lieu of hook 10, a conventional weight (not shown) may be carried at end 8 of shaft portion 2. Also, a further propeller (not shown) such as one same as the type shown at 18, may be mounted on end 3a of shaft portion 3, or a conventional spinner or spoon-type blade (not shown) may be attached at 8 to wobble back and forth to attract fish as well as serving as a weight.

Figure 2A:
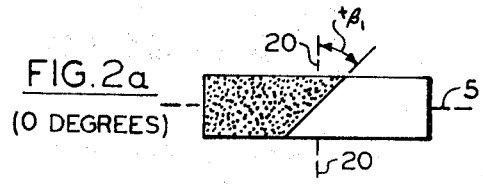
FIGS. 2a through 2d are different side views of a cylinder carrying indicia useful in understanding the operation of the present invention.

The above type of rotatable lure body, which is shown in detail in my above-mentioned copending application Ser. No. 466,395 filed June 23, 1965, is merely one type of rotatable lure body to which the present invention is applicable. A central concept of the present invention is the provision in a rotatable lure body of one or more indicia, such as a boundary line between two contrasting colors, which either substantially encircles the rotatable lure body or at least extends substantially 90 degrees or more around the lure body, in a single direction or several directions such that the boundary line extends at an acute angle to, and crosses a plane perpendicular to the axis of rotation of the lure body. In FIG. 1 line 20—20 defines a plane which is perpendicular to the axis of rotation (defined by shaft portion 5 and bore 13) of lure body 1. In each embodiment of the present invention, a boundary between two contrasting colors extends partially, or all the way around the body at an acute angle relative to the normal plane defined by line 20—20. In FIG. 1 a line shown at 21 represents a boundary line between two contrasting colors which extends all the way around the plug body at acute angle $\beta$ to the plane defined by line 20—20. As the lure body rotates around axis 5, it should be understood that the boundary line 21 appears to move successively forwardly and then rearwardly relative to the body in general. This motion is made more apparent from FIGS. 2a–2d, wherein a similar boundary line is assumed to be painted entirely around a cylinder, and a similar plane normal to the cylinder axis is again indicated by line 20—20. FIG. 2a illustrates a condition comparable to FIG. 1, wherein the middle of the boundary line intersects the normal plane. FIG. 2b illustrates a condition where the cylinder has been rotated (clockwise as viewed from the right-hand end) through 90 degrees, FIG. 2c a rotation of 180 degrees, and FIG. 2d a rotation of 270 degrees. It will be apparent that the boundary line appears to move first rearwardly and then forwardly as the cylinder rotates through one full revolution.

The cylinder illustrated in FIGS. 2a–2d represents a special case in that the boundary line depicted therein is arranged exactly $+\beta_1$ degrees from plane 20—20 one-half of the distance around the cylinder and exactly $-\beta_1$ degrees around the other half of the cylinder. It is unnecessary, of course, that the boundary line extend for any appreciable angle around the cylinder at a *constant* angle, nor is it necessary that the retreating boundary line portions extend at an opposite angle which is *equal* to advancing boundary line portions, nor is it necessary that the boundary line be continuous, i.e. unbroken. These facts may be seen by considering FIG. 2e, which is an unrolled or developed view of the entire circumference of the cylinder of FIGS. 2a–2d, and recognizing that the broken non-linear boundary line 23 would create substantially the same overall effect as linear boundary line 24, which corresponds to that assumed in FIGS. 2a–2d.

Figure 2F:
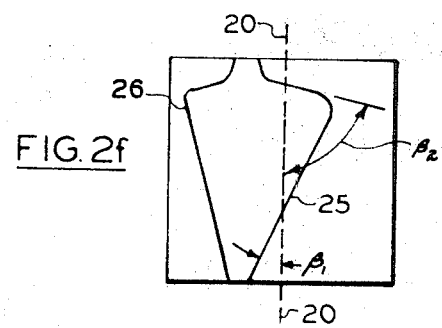
FIGS. 2e through 2g are unrolled or developed views of various indicia-carrying cylinders useful in understanding the operation of various features of the present invention.
Figure 2B:
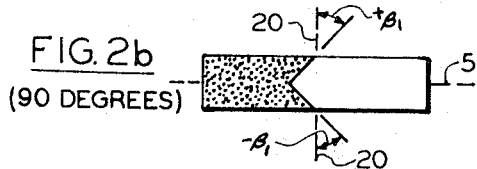
Figure 2C:
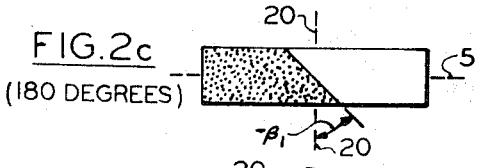

FIG. 2f is a diagram of a developed cylinder in which boundary line 25 progresses approximately two-thirds of the way around the cylinder at a relatively small angle $\beta_1$ to the plane (defined by line 20—20) normal to the axis of rotation, and then completes its path around the cylinder in a direction which extends at a much greater opposite angle $\beta_2$ to the perpendicular plane. If the cylinder depicted by FIG. 2f is rotated at substantially constant angular velocity, it will become apparent that the boundary line will appear to move rather slowly to the left for two-thirds of one revolution of the cylinder, and then to jump relatively quickly to the right during the final third of the revolution. Since insect and animal swimming motions generally involve successive "reach" and "stroke" motions which occur at markedly different speeds, a boundary line arrangement using the principles of boundary line 25 of FIG. 2f provides a useful simulation of animal or insect swimming motions.

FIG. 2f also illustrates the use of a second color-boundary line 26. If one assumes that the area between boundary lines 25 and 26 is one color, and that the areas to the left of line 26 and to the right of line 25 are another color (or two different colors) which contrast to the mid-area, it will be seen that as such a cylinder is rotated, the size of the mid-area will appear to alternately expand and shrink. If a lure using the geometric pattern of FIG. 2f is rotated in one direction, the mid-area will appear to increase in size rather gradually for two-thirds of a revolution and then rapidly decrease in size during the last third of a revolution, while rotation in the opposite direction will cause the mid-area of the lure to appear to decrease from its maximum size to its minimum rather gradually during two-thirds of a revolution and then to rapidly expand to its maximum size during the final third of a revolution.

Figure 2G:
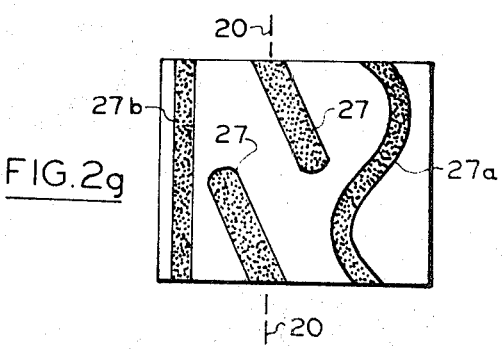
Figure 2D:
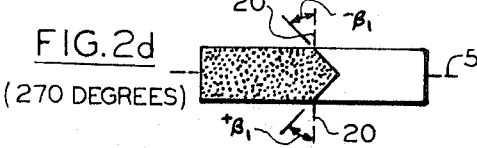
Figure 2E:
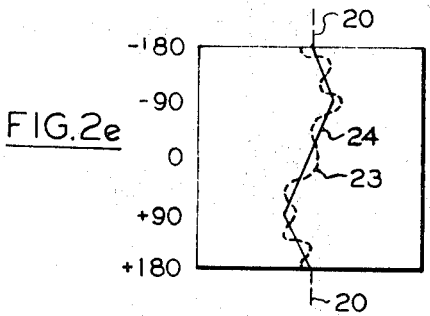

Each of the patterns discussed thus far have been shown as including boundary lines which are "endless," i.e. they close on themselves, although they may constitute broken lines, as typified by line 23 in FIG. 2e. Various embodiments of the invention also may include another basic form of boundary line which is illustrated again by a development of a cylinder in FIG. 2g, wherein a dark helical stripe 27, each side of which is a boundary line, extends through a complete revolution without closing on itself, so that the ends of each boundary line are axially spaced from each other. As the cylinder of FIG. 2g is rotated in one direction, the dark helix stripe will appear to move to the right on the cylinder and then suddenly jump to the left, while opposite rotation of the cylinder will cause it to appear to move to the left at a substantially even speed and then suddenly jump to the right. FIG. 2g also shows a second helical stripe 27a comprising a tilted circle, and a third stripe 27b which extends perpendicularly to the axis of rotation. The three stripes may be the same color, if desired, of different colors.

Figure 2H:
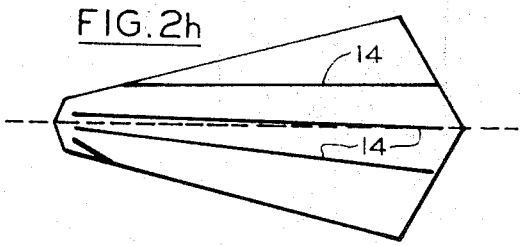

While FIGS. 2a through 2g have assumed the use of a rotatable cylinder for simplicity of explanation, an actual lure body preferably does not utilize the constant diameter nor flat ends of a cylinder, of course. FIG. 2h is a developed view of the outside surface of a more practical body shape having tapered ends. In FIG. 2h approximates the body shown in FIG. 1, and the location of fins 14, 14 on the surface of the body are shown. FIG. 2i is a developed view of a body having tapered ends and carrying a tilted circle 35 which closes on itself, together with two semi-spiral stripes 35a and 35b. It will be seen that rotation of the lure will cause stripe 35 to appear to wobble back and forth, stripes 35a and 35b will appear to progress continuously in one direction.

FIGS. 3a–3f are side views, rather than developed views, of various lure bodies provided with patterns which incorporate various of the principles explained above. FIG. 3a illustrates a basic form of device in which a color boundary line 28 encircles the lure body at an acute angle to the plane perpendicular to the axis of rotation. In fact two such boundary lines 28 and 29 are shown in FIG. 3a extending parallel to each other to provide a stripe around the lure body. It is important to realize that any desired plurality of such boundary lines may be provided. FIG. 3b illustrates the use of a pair of oppositely disposed boundary lines 30 and 31 so that the area between them appears to alternately expand and shrink as the body rotates. If lines 30 and 31 extend at equal but opposite angles to the plane perpendicular to the axis of rotation, the center of the shrinking and expanding area will appear to remain fixed relative to the body, while the use of differing angles will cause the center of the shrinking and expanding area to appear to move rearwardly and forwardly as the lure rotates. FIG. 3b also illustrates at 32 the fact that color boundary lines perpendicular to the axis of rotation may be use together with non-perpendicular boundary lines. The area between lines 32 and 33 will appear to alternately expand and shrink as the lure is rotated, but the location of the side of the area defined by line 32 will remain fixed relative to the ends of the body. FIG. 3c illustrates a further form of spiral stripe which progresses around the body through plural revolutions with an axially or longitudinally varying pitch between adjacent turns of the spiral, FIG. 3c specifically showing a pitch which gradually increases from front to rear of the body. As the lure of FIG. 3c is rotated at a given speed the spiral will appear to move at increasing speeds from front to rear. A spiral boundary line with varying pitch is not only useful on lure bodies which also carry a tilted or wobbling circle, but useful by itself, or with various of the other color boundaries illustrated.

FIG. 3d illustrates the use of an endless boundary line 37 which varies in angle relative to the plane perpendicular to the plane of rotation, so that forward and rearward movement of a given area appears to occur at different speeds. FIG. 3d also shows a non-perpendicular stripe 38 formed by a line of circular spots. FIG. 3e illustrates the use of a pair of non-continuous line or spiral stripe which wind in opposite directions. As the lure is rotated an illusion is created of an arm or front leg suddenly jumping forwardly at the same time that a rear leg suddenly jumps rearwardly, for the reason that the ends of both of the two oppositely-wound spiral stripes lie at the same angular location around the body. If one or the other of the stripes is rotated about the body from the position shown, it will be seen that such simulated front and rear leg motions may be made to occur out-of-phase with each other, at any desired phase relationship. FIG. 3f illustrates a lure body having a single boundary line, i.e. to emphasize that pairs of boundary lines, i.e. stripes, are not necessary. It should be emphasized that the various color boundary line arrangements may be used in a wide variety of combinations, only a few of which have been illustrated, to provide a wide variety of simulated animal arm or leg motions relative to the body.

The speed at which the lure rotates for a given forward speed through the water depends, of course, upon the pitch and size of the propeller means or fins used to provide rotation. The optical illusions mentioned above require that the angular velocity of the lure be somewhat below a rate at which persistence of vision is significant. While the persistence of vision is not known, in practice I prefer to insure that the speed of rotation not exceed approximately ten revolutions per second, when trolling at speeds of approximately 1 or 2 miles per hour.

As previously mentioned, the various tilted or non-perpendicular color boundary lines may be utilized on a variety of rotatable lure bodies, some of which will not carry elongated fins distributed along the body, but which instead will utilize propellers rigidly affixed to the lure bodies at either or both ends thereof.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A fishing lure, comprising, in combination; a lure body; means for providing rotation of said lure body about a longitudinal axis thereof, said lure body having two portions of contrasting colors, a portion of the boundary line between said portions of contrasting colors encircling said lure body at a varying pitch angle of a given sign relative to a plane perpendicular to said longitudinal axis.

2. A lure according to claim 1 in which said boundary line comprises a spiral encircling said body through plural turns, with the two ends of said boundary line longitudinally separated from each other.

3. A lure according to claim 1 in which said boundary line encircles said lure body and includes a second portion having a pitch angle of opposite sign to provide a continuous line around said lure body.

4. A fishing lure, comprising, in combination: a lure body; means for providing rotation of said lure body about a longitudinal axis thereof, said lure body having a first spiral mark encircling said body in a clockwise direction around said axis and a second spiral mark encircling said body in a counterclockwise direction around said axis.

5. A lure according to claim 4 in which said first and second spiral marks are longitudinally spaced apart along said axis.

6. A fishing lure, comprising, in combination: a lure body; means for providing rotation of said lure body about a longitudinal axis thereof, said lure body having two portions of contrasting colors, the boundary line between said portions of contrasting colors encircling said body and having two portions which entend at two acute angles of opposite sign relative to a plane perpendicular to said longitudinal axis, and said lure body having at least one spiral mark which encircles said body at acute angles of a given sign relative to said plane, said spiral mark intersecting said boundary line.

7. A fishing lure, comprising, in combination: a lure body; means for providing rotation of said lure body, said lure body having two portions of contrasting colors separated by a boundary line which varies in longitudinal position as it extends around said lure body, and two portions of contrasting colors separated by a second boundary line which does not vary in longitudinal position as it extends around said lure body.

References Cited
UNITED STATES PATENTS 1,931,932  10/1933  Myers et al. _____ 43—42.36 X WARNER H. CAMP, Primary Examiner U.S. Cl. X.R.

43—42.32